(12) United States Patent
Fortier

(10) Patent No.: US 6,438,895 B1
(45) Date of Patent: Aug. 27, 2002

(54) SPOUT SYSTEM FOR HARVESTING SAP AND METHOD OF USE

(76) Inventor: Bernard Fortier, 1734 Rang 2, St. Pierre Baptiste, Quebec (CA), G0P 1K0

( * ) Notice: Subject to any disclaimer, the term of this patent is extended or adjusted under 35 U.S.C. 154(b) by 0 days.

(21) Appl. No.: 09/472,301

(22) Filed: Dec. 27, 1999

(51) Int. Cl.⁷ .............................................. A01G 23/10
(52) U.S. Cl. ........................ 47/52; 285/38; 285/133.11
(58) Field of Search ................................ 47/50, 51, 52; 285/38

(56) References Cited

U.S. PATENT DOCUMENTS

| | | | | |
|---|---|---|---|---|
| 158,297 A | * | 12/1874 | Mayer ..................... 285/38 X |
| 327,737 A | * | 10/1885 | Strong ........................ 285/38 |
| 530,663 A | * | 12/1894 | Shaw .......................... 285/38 |
| 584,117 A | * | 6/1897 | Lines .......................... 285/38 |
| 2,958,158 A | * | 11/1960 | Hatton .......................... 47/52 |
| 3,046,698 A | * | 7/1962 | Breen et al. .................... 47/52 |
| 4,299,053 A | * | 11/1981 | Foote ............................ 47/52 |
| 4,512,104 A | * | 4/1985 | Lamb ............................ 47/52 |
| 4,884,365 A | * | 12/1989 | Lesquir ......................... 47/52 |
| 4,926,597 A | * | 5/1990 | Landry .......................... 47/52 |
| 5,303,504 A | * | 4/1994 | Buzzell ......................... 47/52 |
| 5,564,227 A | * | 10/1996 | Chabot .......................... 47/52 |

* cited by examiner

Primary Examiner—Lynne H. Browne
Assistant Examiner—David E. Bochna
(74) Attorney, Agent, or Firm—Swabey Ogilvy Renault; Guy J. Houle

(57) ABSTRACT

The present disclosure describes a system composed of a principal pipe joining a secondary pipe by means of a T, and that at the end of the secondary pipe is located a threaded adapter by which comes to connect a spout that one can to disconnect and clean, and which the threaded adapter comes itself to connect at the external stem of T located on the principal pipe in closing the secondary pipe in order to avoid the accumulation of bacteria or detritus at the inside of the secondary pipe.

11 Claims, 5 Drawing Sheets

SPOUT SYSTEM FOR HARVESTING SAP AND METHOD OF USE

FIELD OF THE INVENTION

The present invention generally relates to tree sap harvesting and, more particularly, to a spout system for collecting sap.

BACKGROUND OF THE INVENTION

Sap harvesting methods have evolved from mostly manual operations to become generally automated sap collecting systems. Traditionally, sap was collected by having buckets hanging underneath spouts inserted in tree trunks of trees, such as maples. The sap was then gathered from the buckets and brought to a central shed, wherein syrup and sugar was produced.

In order to minimize labour operations, collecting line networks have been provided in groves in order to collect or pump sap from the trees and convey the sap to the central shed. For instance, Canadian Patent No. 1,158,868, issued on Dec. 20, 1983 to Foote et al. and Canadian Patent No. 1,227,043, issued on Sep. 22, 1987 to Lamb both describe such spout network collecting systems. Both these patents disclose spouts connected to a collecting line network, the spouts being removable from the tree trunks and sealable so as to close the network from bacteria infiltration. The network thus becomes a closed system and may be kept in the grove during the off-seasons (i.e. summer, fall and part of the winter). This closing-off of the collection line network is thus particularly important. If the collection line network required to be removed, fully re-installing it prior to harvesting would involve a substantial amount of labour.

Dried sap accumulates on the exterior surface of the spouts. The exterior surface of the spout is in direct contact with the cortex of the tree. When the spout remains on the collecting line network in the off-seasons, the risk of bacteria development with the dried sap is increased. Therefore, cleaning and even sterilizing of the spouts is recommended. In fact, sterilized spouts may increase by up to 15 to 20% the sap harvesting of a tree. A paraformaldehyde treatment sterilizes the spouts on site, but may have a negative effect on the parenchyma of the tree, thereby enhancing the blight of the tree. Accordingly, it would be desirable to provide a spout system having spouts removable from the collecting line network in order for them to be sterilized and stored during the off-season. This would also protect the spouts from rodents. It would however be required to seal the spoutless ends of the collecting lines for them to remain installed to the line network in the groves.

SUMMARY OF THE INVENTION

It is a feature of the present invention to provide a spout system having spouts which are easily removable from a sap collecting line network.

It is a further feature of the present invention to provide a method of removing the above described spouts from the sap collecting line network.

According to the above feature of the present invention, and from a broad aspect thereof, the present invention provides a spout system for collecting sap from a tree and directing the sap to a sap collecting line. The spout system comprises a spout having a spout portion at a first end thereof adapted to be received in a borehole in a tree trunk for collecting sap therefrom. An outlet at a second end thereof is connected to an adapter. The spout defines a passageway extending between the spout portion and the outlet for sap circulation therethrough. The adapter has at a first end thereof an inlet for being matingly engaged with the spout and in fluid communication with the passageway, a fitting at a second end thereof, the fitting being adapted for being connected to the sap collecting line. The adapter is detachable from the spout and sealable so as to remain connected to the sap collecting line when the spout is disconnected from the sap collecting line.

According to a further broad aspect of the present invention there is provided a spout adapter for connecting a sap collecting line to a spout collecting sap from a tree. The spout adapter comprises an adapter having an inlet at a first end thereof adapted for being matingly engaged with the spout and in fluid communication therewith. A fitting at a second end thereof is adapted for being connected to a tubing. The adapter has a passageway extending between the inlet and the fitting. The passageway is adapted for sap circulation therethrough. A line connector comprises a body having a hollow cavity, a plurality of fittings projecting from the body, passageways between the fittings and the hollow cavity. A first of the fittings is adapted for being connected to the tubing for sap flow connection between the adapter and the line connector. Other fittings are adapted for being connected to the sap collecting line. A plug portion projects from the body. The plug portion is adapted for sealingly receiving the inlet of the adapter when the adapter is detached from the spout.

According to a still further broad aspect of the present invention there is provided a method for disconnecting a sap collecting system from a spout in a tree. The sap collecting spout system is of the type wherein a spout is secured in a borehole in a tree, the spout being connected to a sap collecting line by a tubing having at an end a line connector having a plug portion and linking the tubing to the sap collecting line, and a spout adapter at an opposed end linking the tubing to the spout. The method comprising the steps of (i) disconnecting the spout adapter from the spout; and (ii) plugging the spout adapter by engaging it on the plug portion of the line connector, whereby the spout adapter portion remains on site and the sap collecting line is sealed at the spout adapter.

BRIEF DESCRIPTION OF THE DRAWINGS

A preferred embodiment of the present invention will now be described in detail having reference to the accompanying drawings in which.

DESCRIPTION OF PREFERRED EMBODIMENTS

Figure 1:
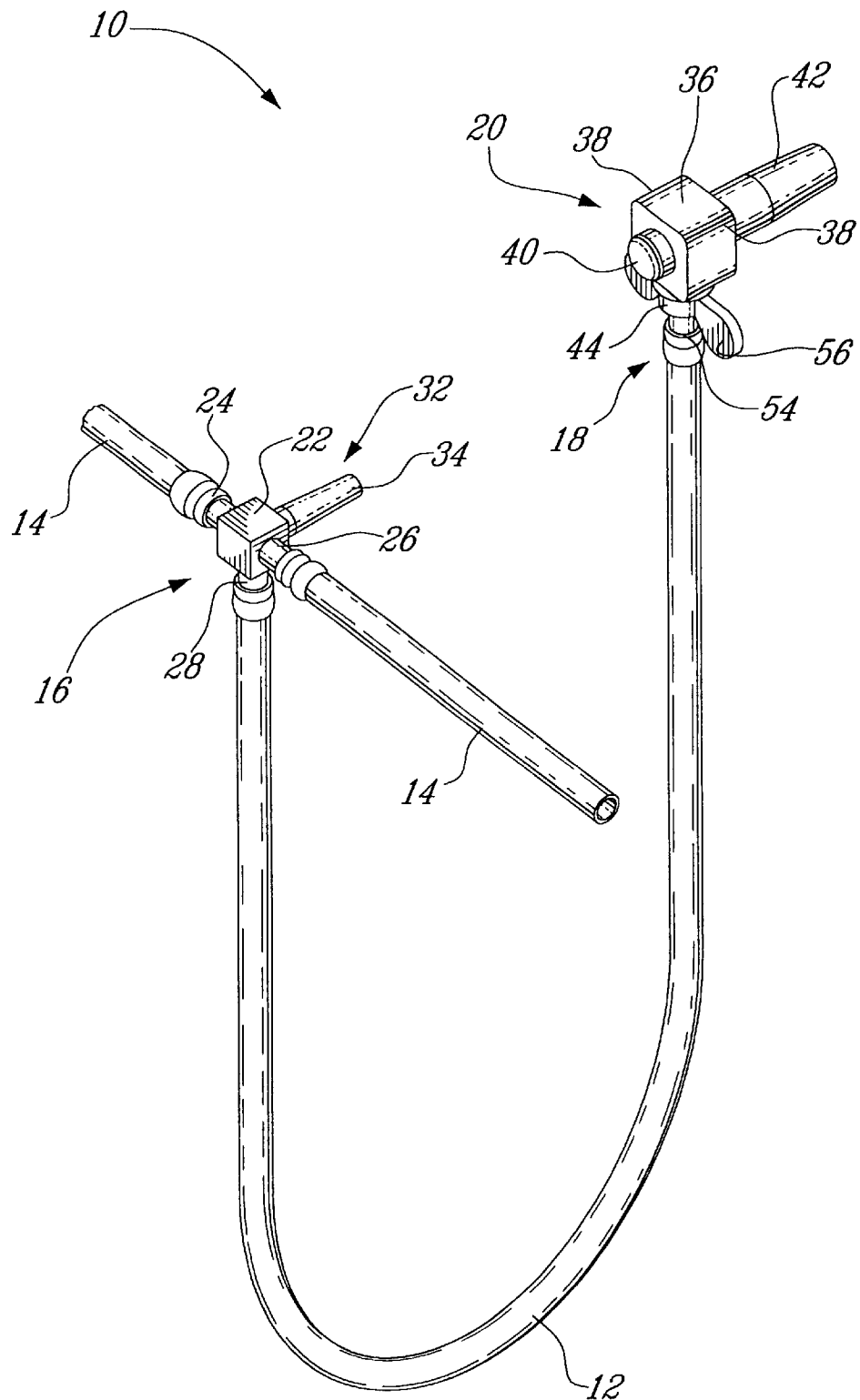
FIG. 1 is a perspective view of a branch line and spout secured to a collecting line system of the present invention for sap harvesting.

Referring to the drawings and more particularly to FIG. 1, the spout system of the present invention is generally shown at 10. For simplicity purposes, the spout system 10 is illustrated with one branch line 12 connected to a main sap collecting line 14. It is pointed out that a plurality of such branch lines 12 are connected thereto to form a sap collecting line network. The branch line 12 is connected to the sap collecting line 14 through a line connector 16. On the opposed end of the branch line 12 is a spout adapter 18 to which is connected a spout 20. The spout 20 is mounted in a borehole in the trunk or lower portion of a tree, and this will be described hereinafter.

Figure 5:
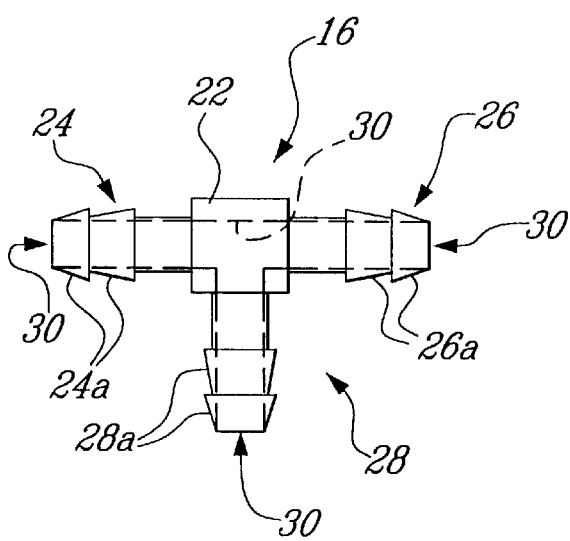
FIG. 5 is a rear elevational view of the line connector.
Figure 6:
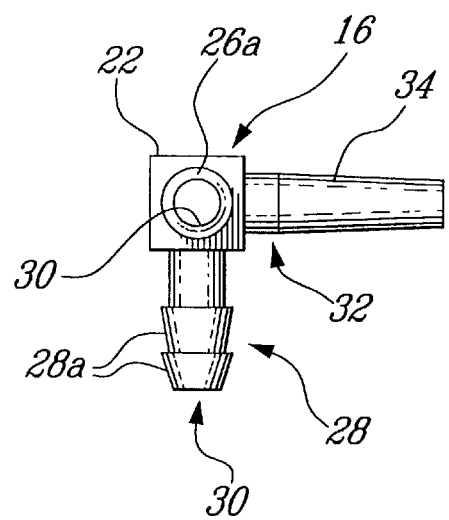
FIG. 6 is a side elevational view of the line connector.
Figure 7:
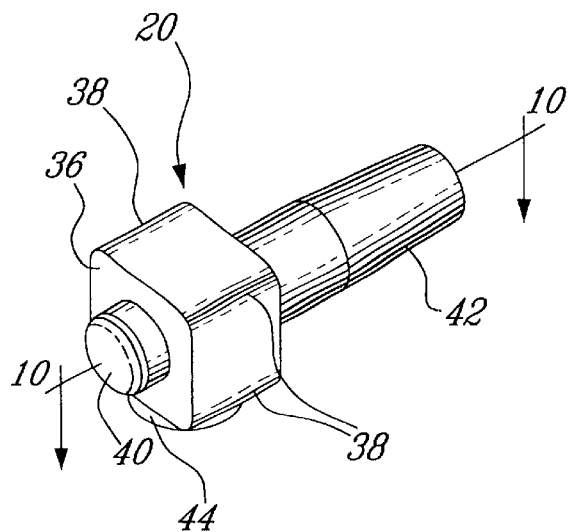
FIG. 7 is a perspective view of the spout.
Figure 8:
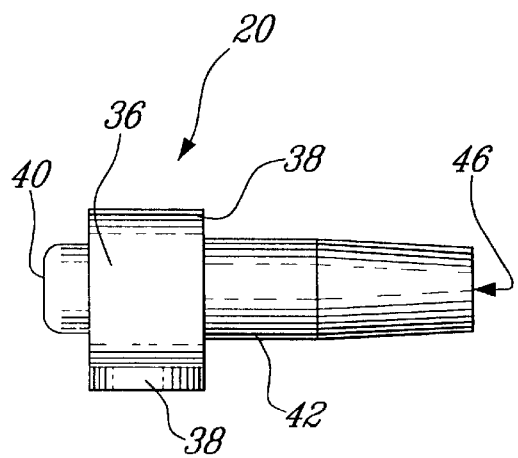
FIG. 8 is a top plan view of the spout.
Figure 9:
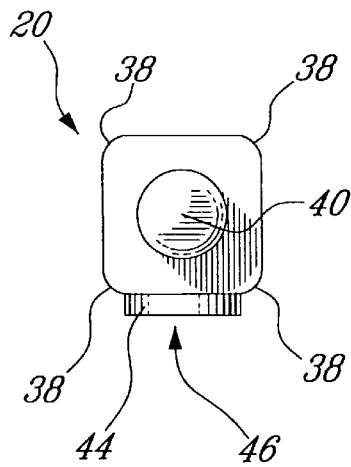
FIG. 9 is a rear elevational view of the spout.

Referring now to FIGS. 3 to 6, the line connector 16 is shown having a generally cubic body 22. Fittings 24 and 26 project outwardly from opposed side surfaces of the cubic body 22, and a fitting 28 projects from a bottom surface of the cubic body 22. The fittings 24, 26 and 28 each comprise ribs 24A, 26A and 28A, respectively, so as to be adapted for receiving tubing thereon in press-fit. As best seen in FIG. 5, the fittings 24, 26 and 28 are interrelated by a T-shaped passageway 30, through which a fluid may circulate.

Referring to FIG. 1, the line connector 16 is shown having the sap collecting line 14 connected to the fittings 24 and 26, whereas the branch line 12 is connected to the fitting 28. The sap collecting line 14 and the branch line 12 are preferably flexible plastic tubing. Plastic tubing is well-adapted to be used as sap collecting line. As the plastic tubing is resilient, its connection to fittings having ribs (such as ribs 24A of fitting 24) is easily achieved by forcing it over the fitting, whereby the junction therebetween is watertight. It is pointed out, however, that other types of conduits may be used for the sap collecting lines 14 and the branch line 24. A solid plug 32 projects outwardly from a front surface of the cubic body 22. The plug 32 has a tapered end 34. The line connector 16 may consist of various materials, such as moldable plastics, metal, etc.

Figure 10:
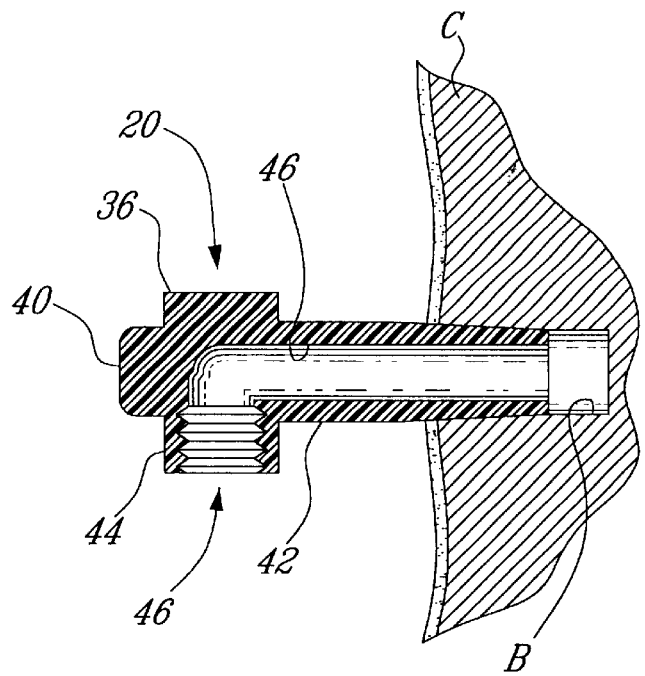
FIG. 10 is a cross-sectional view of the spout taken along cross-section line 10—10 of FIG. 7.
Figure 11:
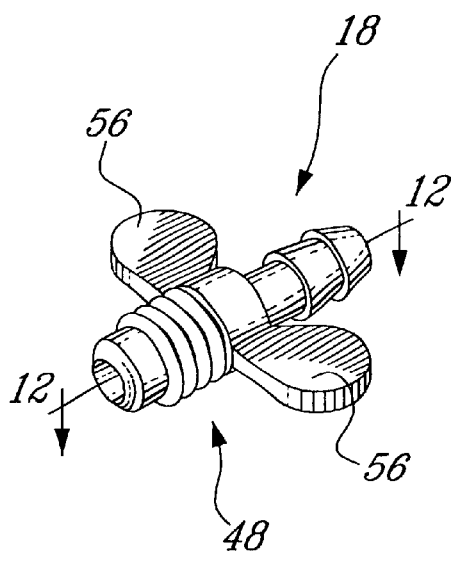
FIG. 11 is a perspective view of a spout adapter of the spout system.
Figure 12:
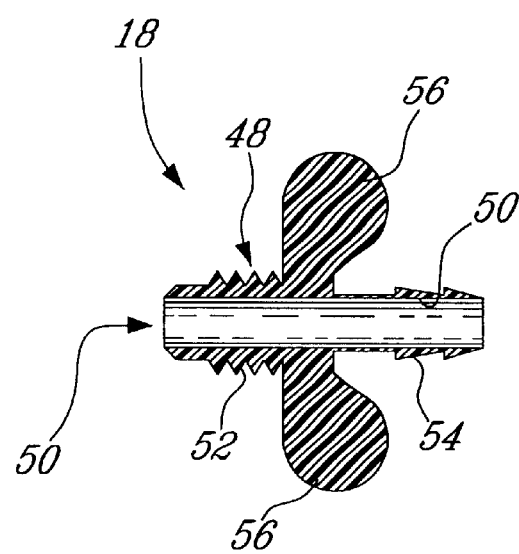
FIG. 12 is a cross-sectional view of the spout adapter taken along cross-section line 12—12 of FIG. 11.
Figure 13:
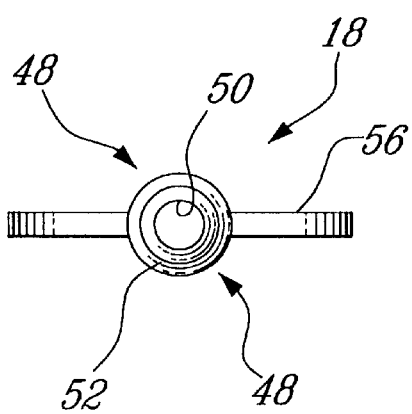
FIG. 13 is a rear elevational view of the spout adapter.
Figure 14:
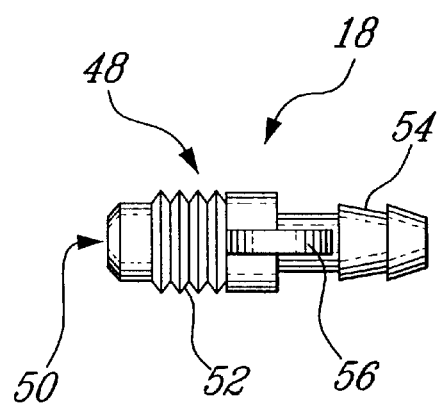
FIG. 14 is a side elevational view of the spout adapter.

Referring now to FIGS. 7 to 10, the spout 20 is shown having a generally cubic body 36. The cubic body has four rounded edges 38 to ensure the safe handling thereof. A knob 40 projects outwardly from a rear surface of the cubic body 36, whereas a tapered spout portion 42 projects from a front surface thereof. A tapped cylinder portion 44 projects from a bottom surface of the cubic body 36. As best seen in FIG. 10, a passageway 46 is defined extending from the tapped cylinder portion 44 to the tapered spout portion 42.

The spout 20 is adapted to be inserted in a borehole drilled in a tree, such as a maple tree. The borehole is made in the tree trunk and the tapered spout portion 42 of the spout 20 is inserted therein. Therefore, the knob 40 is adapted for the spout 20 to be hammered in the borehole B. Thus, the spout 20 consists of a material capable of withstanding the impacts of a hammer and of being forcibly inserted in the borehole of the tree trunk. As seen in FIG. 10, once the spout 20 is installed in the borehole B, the tapered spout portion 42 reaches the cortex C of the tree, whereby sap flowing in the cortex C may be collected by the spout 20 through the passageway 46.

Referring now to FIGS. 11 to 14, the spout adapter 18 is shown in detail. The spout adapter 18 has a generally cylindrical body 48 defining a passageway 50. A first end portion of the cylindrical body 48 comprises threads 52, whereas the other portion of the cylindrical body 48 has ribs 54 thereon. The ribs 54 portion and the threads 52 portion are separated by a pair of wings 56. The spout adapter 18 is adapted for being engaged to the spout 20 by means of the threads 52 being correspondingly received in the tapped cylinder portion 44 of the spout 20, as shown in FIG. 1. The opposed end, comprising the ribs 54, is mounted to the branch line 12, as described above. The wings 56 are provided for torquing the screwing of the spout adapter 18 in the spout 20. Accordingly, the spout 18 may easily be attached to or separated from the spout 20.

Figure 2:
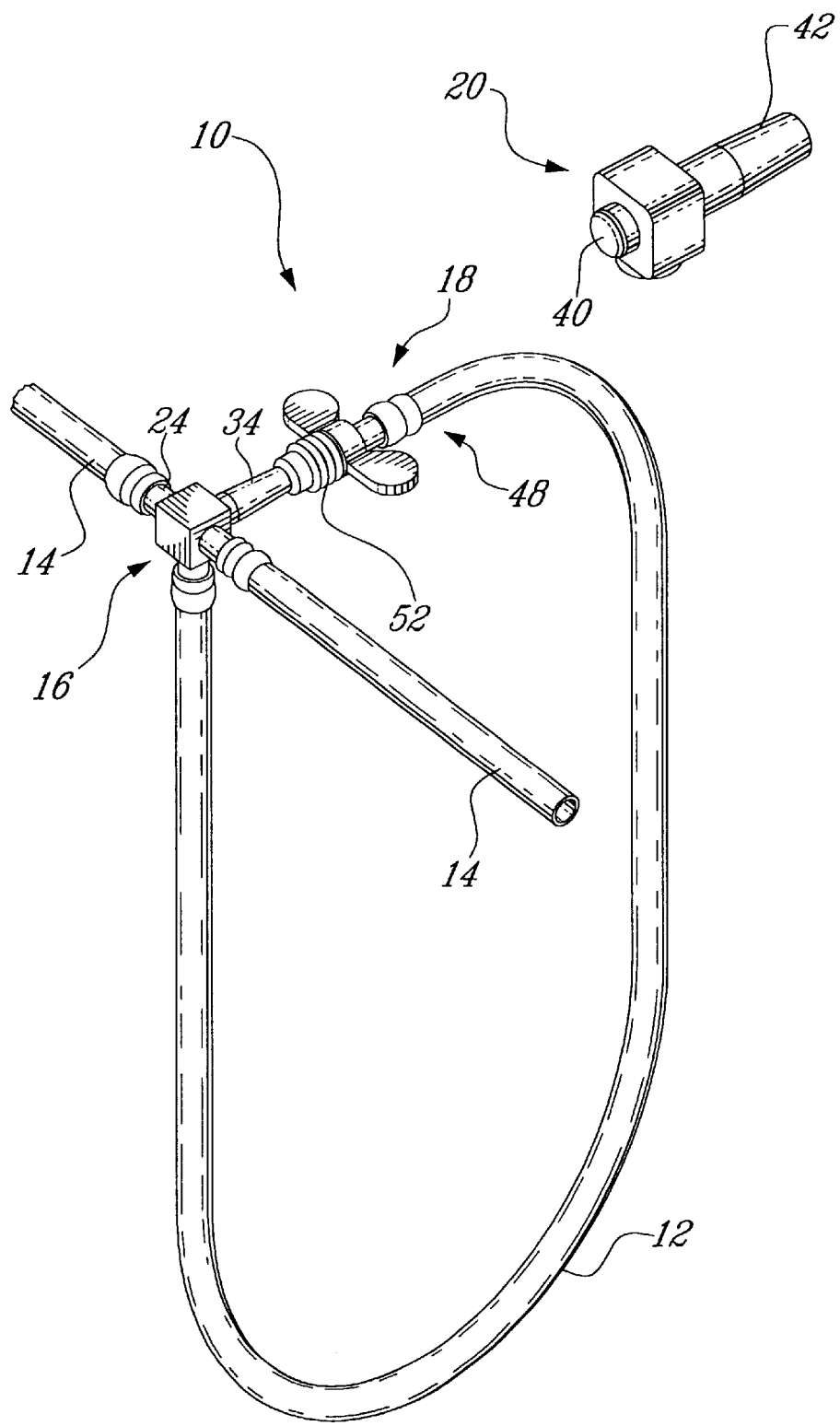
FIG. 2 is a perspective view of the spout system sealed during the off-season.
Figure 3:
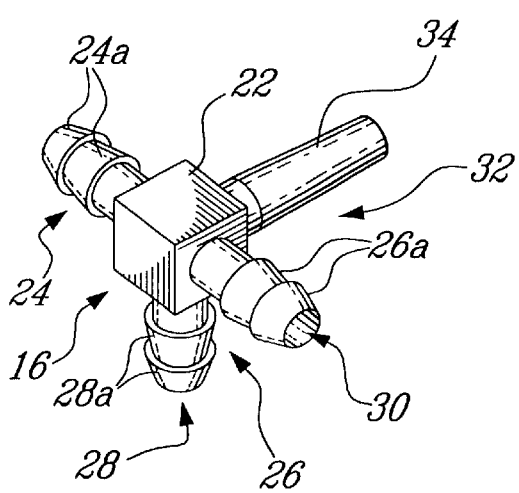
FIG. 3 is a perspective view of a line connector of the spout system.
Figure 4:
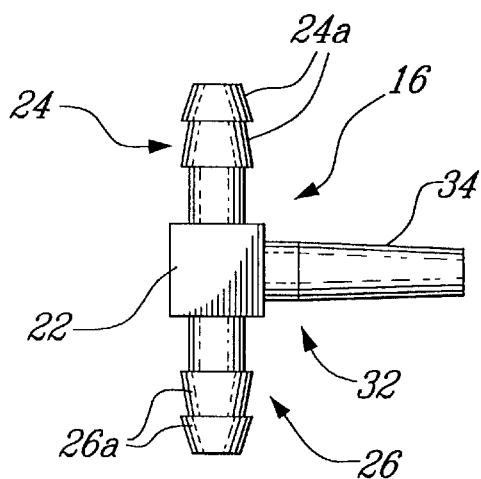
FIG. 4 is a top plan view of the line connector.

Referring now to FIG. 2, the spout system 10 of the present invention is shown in its off-season configuration. Accordingly, the spout adapter 18 is removed from the spout 20. The spout adapter 18 is received on the solid plug 32 of the line connector 16 through its passageway 50. The tapered end 34 of the plug 32 ensures the complete sealing of the connection between the spout adapter 18 and the line connector 16. Therefore, the branch line 12 forms a closed loop, thereby preventing infiltration of bacteria therein. Furthermore, water may be blown through the lines prior to closing off the branch lines 12 on the plugs 32 in order to empty or flush the lines of sap residues. Following the water cleaning of the various branch lines 12 and the sap collecting line 14, the closing-off of the various branch lines ensures the tidiness and cleanliness of the system.

Advantageously, the spouts 20 may be removed from the boreholes B on the trees in order to be stored during off-season. This permits the cleaning and sterilizing of the inside and the outside of the spouts 20, and greatly reduces the risks of infection between a spout 20 and a borehole in a tree at the next insertion and consequently lower yield. Furthermore, removing the spouts 20 prevents the clogging of the boreholes B, which causes the premature stoppage of the spring flow of sap.

It is within the ambit of the present invention to cover any obvious modifications of the embodiments described herein, provided such modifications fall within the scope of the appended claims.

What is claimed is:

1. A spout system for collecting sap from a tree and directing said sap to a sap collecting line, comprising:
   a spout having a spout portion at a first end thereof adapted to be received in a borehole in a tree trunk for collecting sap therefrom, an outlet at a second end thereof for being connected to an adapter, said spout defining a passageway extending between said spout portion and said outlet for sap circulation therethrough;
   said adapter having at a first end thereof an inlet for being matingly engaged with said spout and in fluid communication with said passageway, a fitting at a second end thereof, said fitting being adapted to be connected to a tubing, said adapter being detachable from said spout; and
   a line connector having a body defining a hollow cavity, at least two fittings projecting from said body, passageways between said fittings and said hollow cavity, a first of said fittings adapted to be connected to said fitting of said adapter by a tubing for sap flow connection between said adapter and said line connector, at least a second of said fittings adapted for being connected to said sap collecting line, and a plug portion projecting from said body, said plug portion being adapted for sealingly receiving said inlet of said adapter when said adapter is detached from said spout.

2. The spout system according to claim 1, wherein said outlet of said spout is threaded and said inlet of said adapter is correspondingly threaded for mating threaded engagement therebetween.

3. The spout system according to claim 2, wherein said adapter has a pair of wings for facilitating said the screwing and torquing of said adapter to said spout.

4. The spout system according to claim 1, wherein said fitting of said adapter comprises a plurality of radially projecting ribs for sealingly receiving tubing thereon.

5. The spout system according to claim 1, wherein said spout has a knob for receiving impacts to drive said spout portion of said spout in said borehole of said tree.

6. The spout system according to claim 1, wherein said spout portion of said spout defines a generally cylindrical shape with a tapered end.

7. A spout adapter for connecting a sap collecting line to a spout collecting sap from a tree, comprising:

an adapter having an inlet at a first end thereof adapted for being matingly engaged with said spout and in fluid communication therewith, a fitting at a second end thereof adapted for being connected to a tubing, said adapter having a passageway extending between said inlet and said fitting, said passageway being adapted for sap circulation therethrough; and a line connector comprising a body having a hollow cavity, at least two fittings projecting from said body, passageways between said fittings and said hollow cavity, a first of said fittings adapted for being connected to said tubing for sap flow connection between said adapter and said line connector, at least a second of said fittings adapted for being connected to said sap collecting line, and a plug portion projecting from said body, said plug portion being adapted for sealingly receiving said inlet of said adapter when said adapter is detached from said spout.

8. The spout adapter according to claim 7, wherein said line connector has two fittings connected to said sap collecting line so as to be serially connected to at least another spout adapter.

9. The spout adapter according to claim 7, wherein said fittings of said line connector and said adapter each comprise a plurality of radially projecting ribs for sealingly securing tubing thereto.

10. The spout adapter according to claim 9, wherein said plug portion defines a generally cylindrical body having a tapered end.

11. The spout adapter according to claim 10, wherein said inlet of said adapter is threaded for mating threaded engagement with said spout.

\* \* \* \* \*